(12) United States Patent
Ahn et al.

(10) Patent No.: US 9,415,505 B2
(45) Date of Patent: Aug. 16, 2016

(54) DEVICE AND METHOD FOR DYNAMIC RECONFIGURATION OF ROBOT COMPONENTS

(71) Applicant: KOREA INSTITUTE OF SCIENCE AND TECHNOLOGY, Seoul (KR)

(72) Inventors: Sang Chul Ahn, Seoul (KR); Yong-Moo Kwon, Seoul (KR); Ui Kyu Song, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 164 days.

(21) Appl. No.: 13/739,186

(22) Filed: Jan. 11, 2013

(65) Prior Publication Data

US 2014/0142750 A1    May 22, 2014

(30) Foreign Application Priority Data

Nov. 20, 2012  (KR) .................. 10-2012-0131725

(51) Int. Cl.
*B25J 9/00* (2006.01)
*B25J 9/16* (2006.01)

(52) U.S. Cl.
CPC .. *B25J 9/00* (2013.01); *B25J 9/161* (2013.01); *G05B 2219/33334* (2013.01); *G05B 2219/39167* (2013.01); *Y10S 901/01* (2013.01)

(58) Field of Classification Search
CPC .. B25J 9/08; B25J 9/1602; G05B 2219/1602; G06N 3/008
USPC .............................. 700/247, 249, 256; 901/1
See application file for complete search history.

(56) References Cited

U.S. PATENT DOCUMENTS

| | | | | |
|---|---|---|---|---|
| 6,266,577 | B1 * | 7/2001 | Popp et al. ................... | 700/248 |
| 7,302,312 | B2 * | 11/2007 | Murray et al. ................ | 700/250 |
| 2011/0010518 | A1 * | 1/2011 | Kavuri et al. ................. | 711/165 |
| 2012/0072020 | A1 * | 3/2012 | Jung et al. .................... | 700/250 |

FOREIGN PATENT DOCUMENTS

| | | |
|---|---|---|
| KR | 10-2009-0092128 | 8/2009 |
| KR | 10-2012-0077955 | 7/2012 |

* cited by examiner

*Primary Examiner* — Jerrah Edwards
(74) *Attorney, Agent, or Firm* — NSIP Law

(57) ABSTRACT

A device for dynamic reconfiguration of robot components includes: a resource monitoring unit for monitoring resources of a plurality of boards on which components for executing tasks of a robot are loaded; a dynamic reconfiguration unit for dynamically reconfiguring components of the boards, in the case at least one of the boards is at a risk for a scarcity of resources; and a log managing unit for storing a configuration of present components and a configuration of reconfigured components. Accordingly, it is possible to recognize a scarcity of resources in advance while the robot is operating and prevent the robot from malfunctioning by distributing the components.

19 Claims, 5 Drawing Sheets

FIG. 3
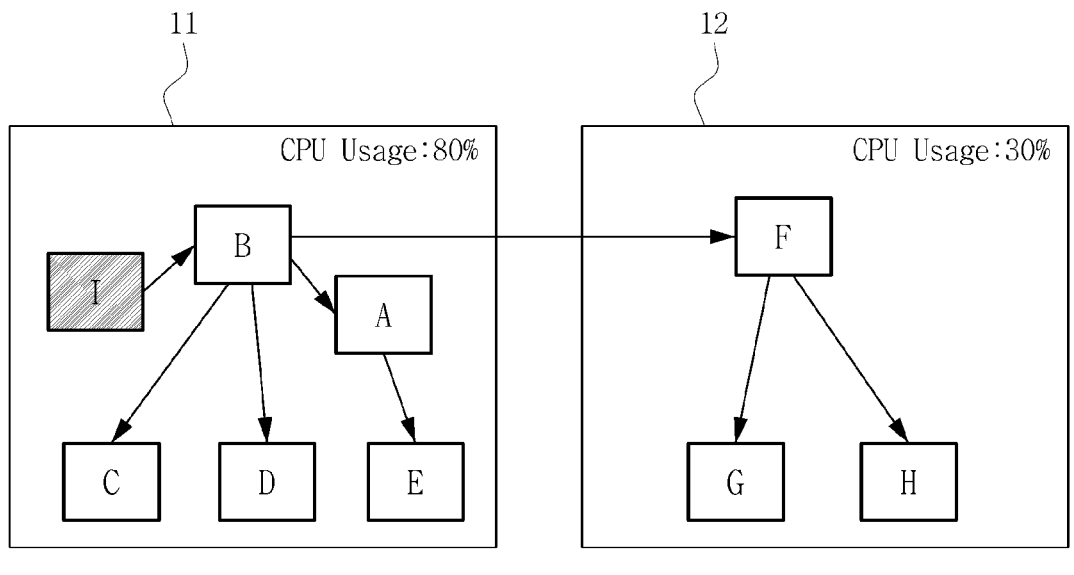
(a)
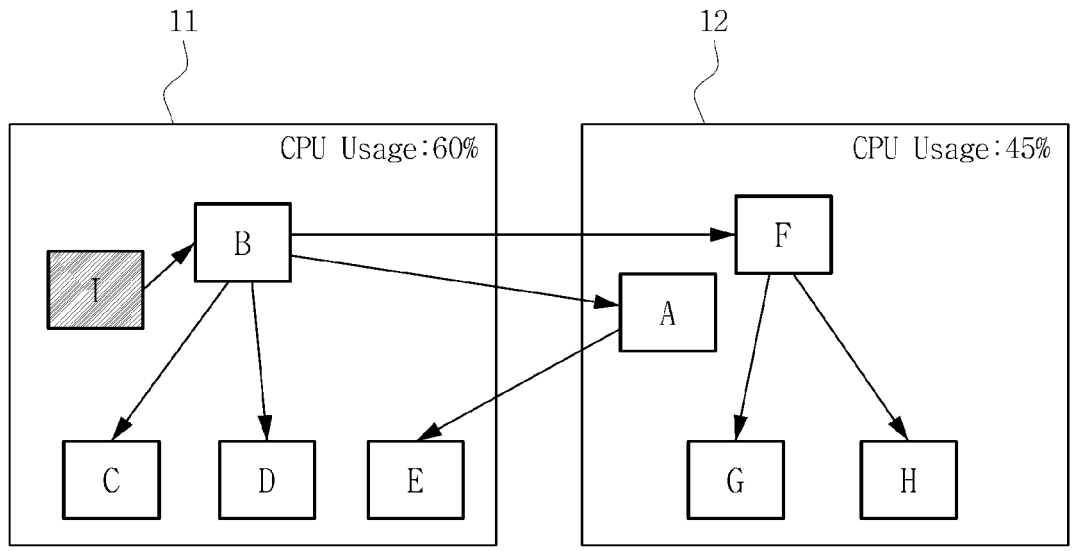
(b)

DEVICE AND METHOD FOR DYNAMIC RECONFIGURATION OF ROBOT COMPONENTS

CROSS-REFERENCE TO RELATED APPLICATION

This application claims priority to Korean Patent Application No. 10-2012-0131725, filed on Nov. 20, 2012, and all the benefits accruing therefrom under 35 U.S.C. §119, the contents of which in its entirety are herein incorporated by reference.

BACKGROUND

1. Field

The present disclosure relates to a device and method for dynamic reconfiguration of robot components, and more particularly, to a device and method for dynamic reconfiguration of a robot on which multiple boards are loaded or a robot component on which a single board operating in a networking environment is loaded.

2. Description of the Related Art

A robot gradually substitutes more regions of human works. However, a robot is generally designed to perform a specific work. In recent, robots for performing various kinds of housework such as dish-washing, laundry, cooking and cleaning are being developed, and a plurality of computers are generally loaded on a robot to perform various works. This is because a plurality of sensors and actuators are installed at the robot and various kinds of software should be set to control the sensors and the actuators.

Each computer is called a single board computer (SBC), and it basically has the same configuration as a PC but has a minimized size to be loaded on the robot.

A robot requires a set of software functions in order to perform service. For example, in order to serve a cup of drink, there are required a vocalization recognizer (for recognizing a command of a user), a dialog processor (for finding a kind of drink desired by the user), a text-voice converting module (for transferring a voice guidance to the user), a navigator (for moving to the user or a kitchen), and an arm manipulator (for gripping a cup). This means that the robot should execute software functions simultaneously and inevitably suffers from resource contention.

In the present robot technology, hardware, software, algorithm or the like for operating a robot are configured as components or modules. If they are configured as components, costs required for the development of robots are reduced due to the easier development, enhanced application and better recycling, which allows general users to use robots more easily.

Due to such technical improvements, general users having no relevant knowledge about hardware of a robot may download and freely utilize developed components and make a scenario for allowing his robot to perform various tasks.

However, since a robot system has a limited resource (CPU, memory capacity or the like), if it is not suitable to configure components, there may occur a scarcity of resources while operating a robot according to components or tasks. In this case, the robot may not perform the given task properly, and so it is required to provide a method for efficiently using limited resources.

SUMMARY

The present disclosure is directed to providing a device for dynamic reconfiguration of robot components, which may prevent malfunction of a robot caused by a scarcity of resources by reconfiguring components.

The present disclosure is also directed to providing a method for dynamic reconfiguration of robot component, which may prevent malfunction of a robot caused by a scarcity of resources by reconfiguring components.

In one aspect, there is provided a device for dynamic reconfiguration of robot components, which includes: a resource monitoring unit for monitoring resources of a plurality of boards on which components for executing tasks of a robot are loaded; a dynamic reconfiguration unit for dynamically reconfiguring components of the boards, in the case at least one of the boards is at a risk for a scarcity of resources; and a log managing unit for storing a configuration of present components and a configuration of reconfigured components.

In an embodiment of the present disclosure, the dynamic reconfiguration unit may select a first component, which is executable on a second board, from components of a first board which is at a risk for a scarcity of resources, and load the selected first component on the second board.

In an embodiment of the present disclosure, after components are reconfigured, in the case the second board is at a risk for a scarcity of resources, the dynamic reconfiguration unit may select a component from the components of the second board and load the selected component on the first board or a third board.

In an embodiment of the present disclosure, when components are reconfigured, the dynamic reconfiguration unit may exclude a configuration of a component which is at a risk for a scarcity of resources, based on the configuration of components stored in the log managing unit.

In an embodiment of the present disclosure, in the case the second board is at a risk for a scarcity of resources, the dynamic reconfiguration unit may select the first component from the components of the second board and load the selected first component on the third board, or select a second component and load the selected second component on the first board or the third board.

In an embodiment of the present disclosure, the selected first component may be an algorithm processing component or a calculation component.

In an embodiment of the present disclosure, the first board and the second board may be formed in the robot.

In an embodiment of the present disclosure, the first board may be formed in the robot and the second board may be formed out of the robot.

In an embodiment of the present disclosure, the second board may be formed in another external robot or another external computer in a networking environment with the robot.

In an embodiment of the present disclosure, the device may further include a communication unit for making network communication with the outside of the robot.

In another aspect, there is provided a method for dynamic reconfiguration of robot components, which includes: monitoring resources of a plurality of boards on which components for executing tasks of a robot are loaded; storing a configuration of present components, in the case at least one of the boards is at a risk for a scarcity of resources; dynamically reconfiguring components of the boards; and storing a configuration of the reconfigured components.

In an embodiment of the present disclosure, the dynamically reconfiguring of components of the boards may include: selecting a first component, which is executable on a second board, from components of a first board which is at a risk for a scarcity of resources; and loading the selected first component on the second board.

In an embodiment of the present disclosure, the loading of the selected first component on the second board may include: temporarily stopping the execution of applications of the first and second boards; unloading the first component from the first board; loading the first component on the second board; and requesting re-execution of the temporarily stopped application.

In an embodiment of the present disclosure, the dynamically reconfiguring of components of the boards may include: selecting a component from the components of the second board, in the case the second board is at a risk for a scarcity of resources, after components are reconfigured; and loading the selected component on the first board or a third board.

In an embodiment of the present disclosure, the dynamically reconfiguring of components of the boards may include excluding a configuration of a component which is at a risk for a scarcity of resources, based on the configuration of the stored components, when reconfiguring components.

In an embodiment of the present disclosure, the dynamically reconfiguring of components of the boards may include excluding the first component from the components of the second board, when selecting a component to be loaded on the first board.

In an embodiment of the present disclosure, the loading of the first component on the second board may include loading the first component from the first board formed in the robot on the second board formed in the robot.

In an embodiment of the present disclosure, the loading of the first component on the second board may include loading the first component from the first board formed in the robot on the second board formed in another external robot or another external computer in a networking environment with the robot.

In an embodiment of the present disclosure, the method may further include performing network communication with the outside of the robot.

According to the device and method for dynamic reconfiguration of robot components as described above, it is possible to prevent malfunction of a robot caused by a scarcity of resources by recognizing a situation of a scarcity of resources in advance while the robot is operating, and then distributing robot components in operation.

In addition, even though a user having no knowledge about robot hardware downloads and uses robot components, components may be configured not cause a scarcity of resources so that the robot may efficiently perform a given task.

BRIEF DESCRIPTION OF THE DRAWINGS

The above and other aspects, features and advantages of the disclosed exemplary embodiments will be more apparent from the following detailed description taken in conjunction with the accompanying drawings in which:

FIG. 3 is a diagram before and after components are reconfigured according to the present disclosure;

DETAILED DESCRIPTION

Hereinafter, exemplary embodiments of a device and method for dynamic reconfiguration of robot components according to the present disclosure will be described in detail with reference to the accompanying drawings.

Figure 1:
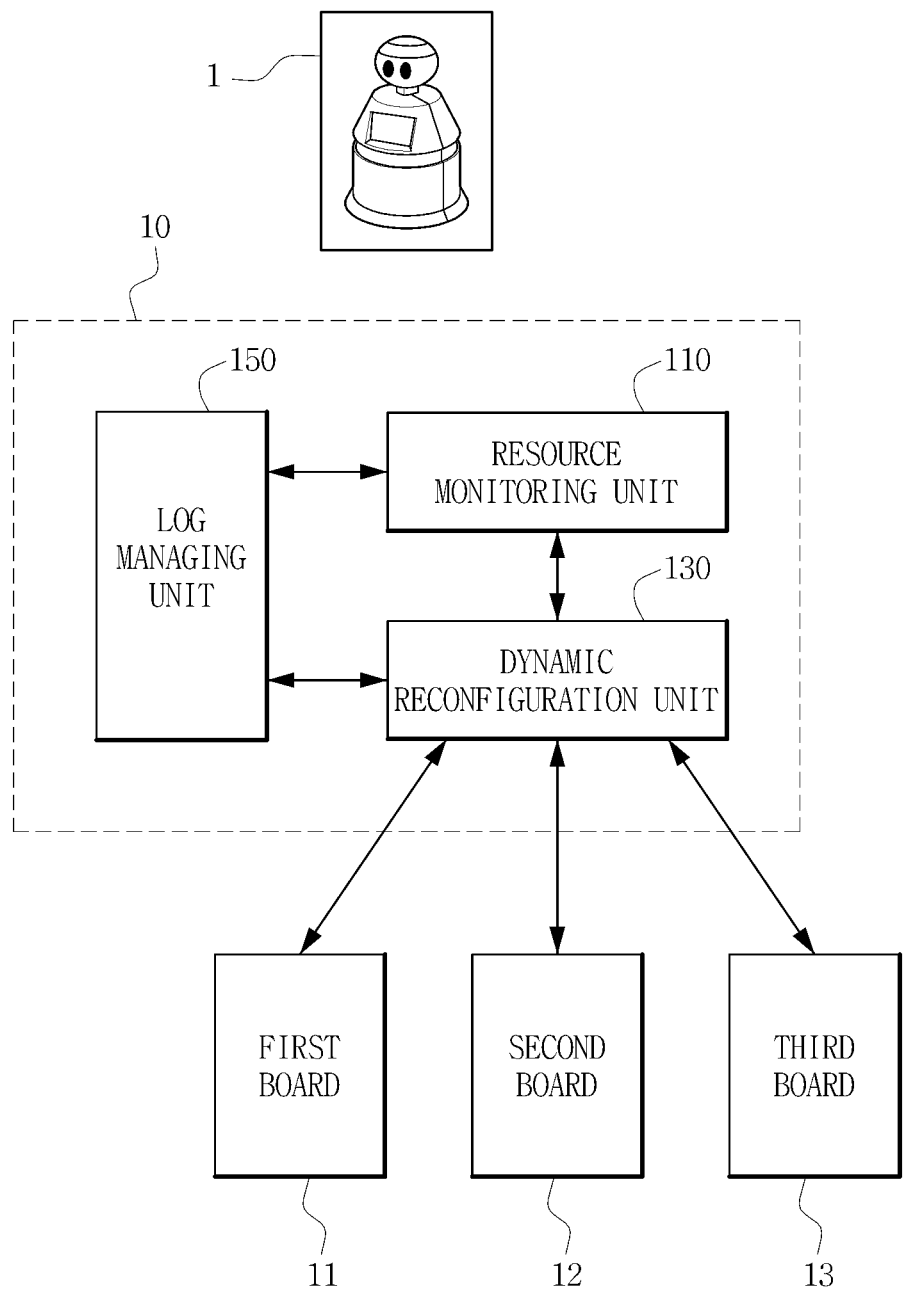
FIG. 1 is a block diagram showing a device for dynamic reconfiguration of robot components according to an embodiment of the present disclosure.

Referring to FIG. 1, a robot 1 includes a device 10 for dynamic reconfiguration of robot components, and a plurality of boards 11, 12, 13 serving as computers for performing robot functions. In other words, the robot 1 is a multi-board robot having a plurality of boards. Components for executing various tasks of the robot 1 are loaded on each board 11, 12 and 13.

The task is a unit of work, which is processed by an operating system (OS) of a computer by allocating resources thereto, and each program is executed by allocating computer resources through the task. In addition, multitasking means that several tasks are performed simultaneously and computer resources are used alternately.

The robot 1 has a set of software functions such as navigation, object recognition, automatic vocalization recognition, and operator in order to provide service. Each software function is designed as an architecture performing an independent function.

The component has a code fragment which may be executed to perform functionality provided by the architecture and also has an interface for communicating with another component. The task requires at least one architecture, and the architecture requires at least one component.

All components consume system resources such as CPU time, a memory, a sensor, an actuator and a network bandwidth. As a result, each task requires a certain portion of system resources and such tasks make resource contention.

Unless the components are dynamically managed, the robot may malfunction due to a scarcity of resources. In the present disclosure, dynamic reconfiguration is performed by spatially managing components in real time so that the robot 1 may properly perform an input command, namely a task.

The component technique means a technique allowing easy development of software like stacking Lego blocks. In other words, the component technique means a technique of making software modules in advance and assembling the modules when developing an application, breaking from an existing coding manner. If such component technique is utilized, complicated information systems may be rapidly constructed, and this may also be reused when building similar information systems.

The component is a software model designed to facilitate reuse and exchange as a software component like a mechanical part, and this may be a function of program or the program itself. For example, a component executing an algorithm may be an algorithm finding a shortest route, and a component having this function may be a monitoring function.

The device 10 for dynamic reconfiguration of robot components according to the present disclosure measures the amount of used resource of each board 11, 12, 13, and, if the amount of used resource of a specific board reaches a dangerous level, the device 10 reconfigures components of the boards 11, 12, 13.

For this, the device 10 for dynamic reconfiguration of robot components includes a resource monitoring unit 110, a dynamic reconfiguration unit 130 and a log managing unit 150. In this embodiment, the device 10 for dynamic reconfiguration of robot components and the boards 11, 12, 13 are formed in the robot 1.

The device 10 for dynamic reconfiguration of robot components according to the present disclosure may be added as a module to an engine of the robot 1, and each component may also be added as a separate module. In addition, the device 10 for dynamic reconfiguration of robot components and each component may be additionally developed and supplied as necessary.

A recent robot system is designed as an open system. In other words, in standardized terminals and contents techniques and transmission standards like HTML and HTTP, contents for a robot may be made and provided to a server of a robot system, and the provided contents may be distributed to users by a service provider.

Accordingly, various service providers may be connected to robots, and costs for robot and service development may be minimized. In addition, robot software techniques where various existing software techniques are optimized, stratified and modulated into a form suitable for robots, and structural standards of external software in linkage with robots may be defined.

The resource monitoring unit 110 monitors the amount of used resource of the boards 11, 12, 13 for each board.

In the conventional art, an amount of used resource is measured for each component, in an off-line estimation method where the use of resource is estimated in real time before components are disposed and an on-line estimation method where the use of resource is estimated in real time after components are disposed. Therefore, a large computation power is required to calculate the use of resource, which causes overhead.

Further, the off-line estimation is not easy since it is very difficult to measure an amount of used resource in advance because a CPU and a memory is used differently while an application or software is running.

On the other hand, in the present disclosure, the amount of resource used is not measured for each component, and the entire amount of used resource of each board is measured during an operation time by means of the on-line estimation method. Therefore, according to the present disclosure, computation power required for calculating the use of resource may be reduced.

While the resource monitoring unit 110 is monitoring resources of the boards 11, 12, 13, if it is determined that at least one board is at a risk for a scarcity of resources, the risk for a scarcity of resources is notified to the dynamic reconfiguration unit 130 and the log managing unit 150.

If the amount of used resource of the corresponding board exceeds a predetermined level, the resource monitoring unit 110 may determine that the corresponding board may be at a risk for a scarcity of resources. Hereinafter, for example, the first board 11 is determined as being at a risk for a scarcity of resources when 80% of CPU is used.

If it is notified that the first board 11 is at a risk for a scarcity of resources, the log managing unit 150 generates, reads, and stores a log about a present arrangement situation of components of the boards 11, 12, 13.

In addition, if it is notified that the first board 11 is at a risk for a scarcity of resources, the dynamic reconfiguration unit 130 reconfigures components the boards 11, 12, 13. The method for reconfiguring components is a trial-and-error method, which prevents a problematic component from being generated again.

In detail, the dynamic reconfiguration unit 130 selects one component to be moved to another board from components of the first board 11 which is at a risk for a scarcity of resources. The selected component is one of components executable at other boards.

Among components, a certain component is executable only when being loaded on a specific board and a certain component is executable regardless of a board on which it is loaded. For example, a sub-dominate component controlling hardware belongs to the former case, and a software component such as an algorithm processing component and a calculation component belongs to the latter case.

The dynamic reconfiguration unit 130 may store a component executable only when being loaded on a specific board (namely, an un-relocatable component) and a component executable though being loaded on any board (namely, a relocatable component) in advance, distinguishably.

The dynamic reconfiguration unit 130 reconfigures components by loading the single selected component from the first board 11 onto a single board among other boards other than the first board 11. In addition, the log managing unit 150 generates, reads, and stores a log about an arrangement situation of the reconfigured components of the boards 11, 12, 13.

Hereinafter, the case of selecting a first component and loading the selected first component on a second board 12 will be described.

Specifically, the first board 11 temporarily stops a running application and also requests the second board 12 to stop a running application. Subsequently, the selected first component is unloaded from the first board 11. In addition, the unloaded first component is requested to be loaded on the second board 12. After that, the first board 11 re-executes the stopped application and also requests the second board 12 to re-execute the stopped application.

As described above, after components are reconfigured, if the scarcity of resources is not solved or a scarcity of resources occurs at another board to which a component is moved, components are reconfigured in the same way as above. In this case, based on the configuration of components stored in the log managing unit 150, a configuration of components where a scarcity of resources has occurred is excluded.

Specifically, among components of the second board 12, a single component to be moved to another board is selected. In this embodiment, the "another board" is a first board 11 or a third board 13, not the second board 12.

When a component to be moved to the first board 11 again is selected from components of the second board 12, the first component is excluded. The first component has been already moved from the first board 11, and so, if the first component is loaded on the first board 11 again, there is a risk for a scarcity of resources.

On the other hand, when a component to be moved to the third board 13 again is selected from components of the second board 12, the first component is not excluded.

Therefore, among components of the second board 12, a second component other than the first component is selected and loaded on the first board 11, or either the first component or the second component is selected and loaded on the third board 13. In this way, it is prevent to prevent only one component from coming and going (ping-pong movement).

Therefore, if the device 10 for dynamic reconfiguration of robot components according to the present disclosure is used, it is possible to recognize a scarcity of resources in advance while the robot is in operation, and prevent a scarcity of resources in advance by distributing components. Specifically, after measuring an amount of used resource of each board in the robot, if it is determined that a specific board is at a risk for a scarcity of resources, components may be reconfigured by loading a single component on another board. Accordingly, computation power required for measuring an amount of used resource may be reduced, and the amount of used resource of a board may be optimized by reconfiguring components.

Figure 2:
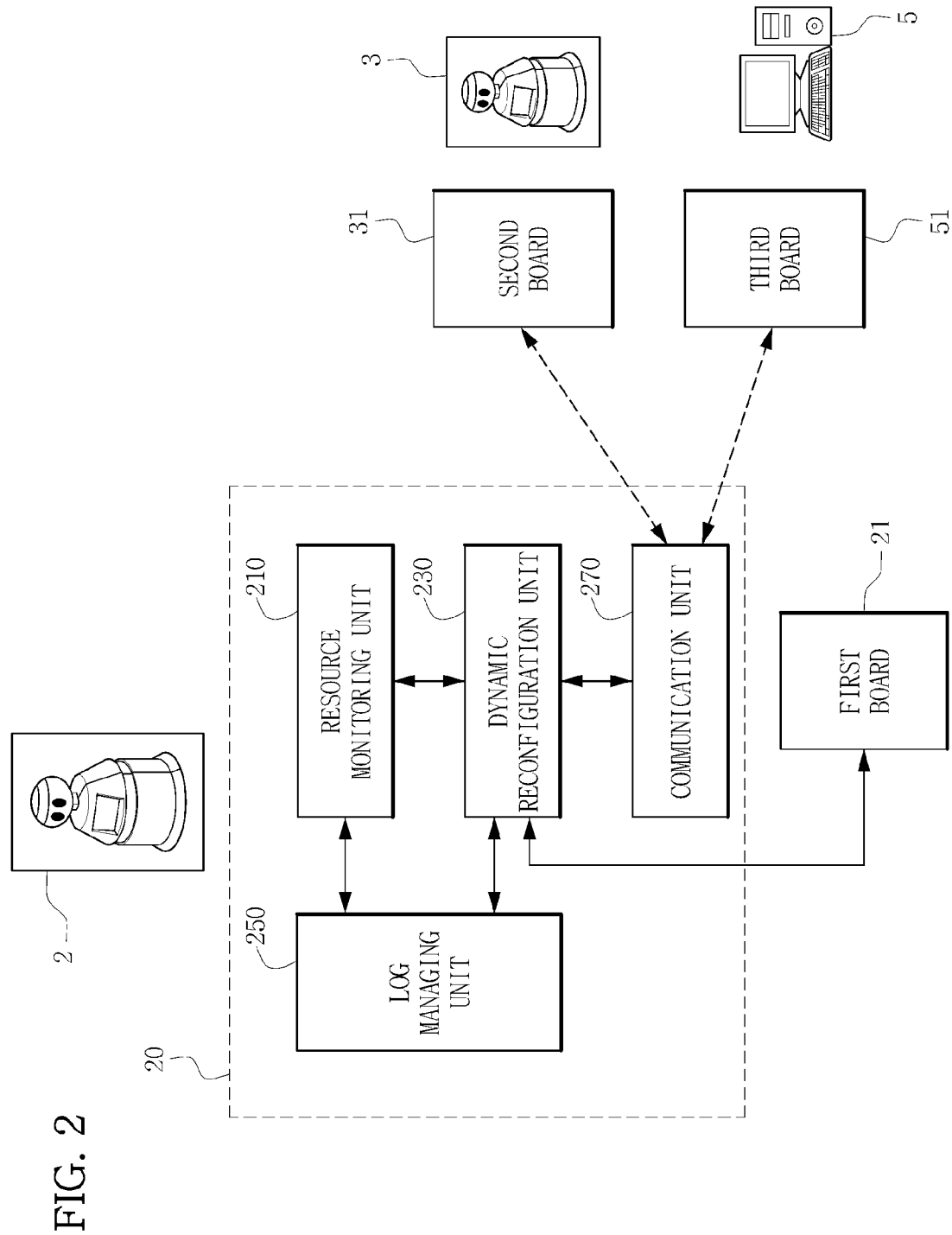
FIG. 2 is a block diagram showing a device for dynamic reconfiguration of robot components according to another embodiment of the present disclosure.

FIG. 2 is a block diagram showing a device for dynamic reconfiguration of robot components according to another embodiment of the present disclosure.

The device 20 for dynamic reconfiguration of robot components according to this embodiment is substantially identical to the device 10 for dynamic reconfiguration of robot components, shown in FIG. 1, except for a communication unit 270, and so the same elements as in the device 10 for dynamic reconfiguration of robot components, shown in FIG. 1, will not be described in detail here.

Referring to FIG. 2, the robot 2 includes a device 20 for dynamic reconfiguration of robot components and a board 21 serving as a computer for performing a robot function. In other words, the robot 2 is a single board robot having a single board.

The device 20 for dynamic reconfiguration of robot components according to an embodiment of the present disclosure measures an amount of used resource of the board 21, and, if the amount of used resource of the board 21 reaches a dangerous level, the device 20 reconfigures components of the board 21.

For this, the device 20 for dynamic reconfiguration of robot components includes a resource monitoring unit 210, a dynamic reconfiguration unit 230, a log managing unit 250 and a communication unit 270.

The robot 2 may further include the communication unit 270 for communication with an external network and may communicate with other boards 31, 51 formed out of the robot 2 through the communication unit 270. In this embodiment, other boards 31, 51 may be boards formed in another robot 3 or another computer 5 in a networking environment with the robot 2.

The resource monitoring unit 210 measures an amount of used resource of the board 21 formed in the robot 2. The resource monitoring unit 210 may directly monitor resources of other boards 31, 51 through the communication unit 270. In addition, a resource monitoring unit for measuring amounts of used resources of other boards 31, 51 may be separately formed, and the resource monitoring unit 210 may receive information about the amount of used resource of the corresponding board.

If it is determined that the board 21 is at a risk for a scarcity of resources while the resource monitoring unit 210 is monitoring resources of the board 21, the risk for a scarcity of resources is notified to the dynamic reconfiguration unit 230 and the log managing unit 250. If the amount of used resource of the board 21 exceeds a predetermined level, the resource monitoring unit 210 may determine that the corresponding board is at a risk for a scarcity of resources.

If it is notified that the board 21 is at a risk for a scarcity of resources, the log managing unit 250 generates, reads, and stores a log about a present arrangement situation of components of the board 21. In addition, a log about a component arrangement situation of other external boards 31, 51 capable of network communication may also be stored.

In addition, if it is notified that the board 21 is at a risk for a scarcity of resources, the dynamic reconfiguration unit 230 reconfigures components of the present board 21 and other external boards 31, 51. The method of reconfiguring components is substantially identical to that of the former embodiment shown in FIG. 1, except that components are reconfigured through networking communication with other boards 31, 51 formed out of the robot 2.

Therefore, if the device 20 for dynamic reconfiguration of robot components according to this embodiment is used, after monitoring an amount of used resource of the board in the robot, if it is determined that the board is at a risk for a scarcity of resources, components may be reconfigured by loading a component on another board out of the robot. Therefore, even though a robot uses a single board, components may be reconfigured by communicating with other external robots or other external computers. Accordingly, the amount of used resources of the board in the robot may be optimized, and the robot may properly perform a task.

Hereinafter, situations before and after components are reconfigured according to the present disclosure will be comparatively described with reference to FIGS. 3 and 4.

FIG. 3 is a diagram before and after components are reconfigured according to the present disclosure. FIG. 4 is a diagram for illustrating an example of detailed components of FIG. 3.

Referring to a portion (a) of FIG. 3, the robot 1 is operating in a state where a plurality of components A, B, C, D, E are arranged in the first board 11. At this time, if a user adds a new component I to the first board 11, more system resources are used and the risk for a scarcity of resources increases. For example, it is assumed that 80% of a CPU has been used.

The resource monitoring unit 110 detects a risk for a scarcity of resources while monitoring an amount of used resource of the first board 11, and notifies it to the dynamic reconfiguration unit 130 and the log managing unit 150.

The log managing unit 150, which has received the notification that the first board 11 is at a risk for a scarcity of resources, stores a log about a current component arrangement situation of the boards 11, 12, and the dynamic reconfiguration unit 130 reconfigures components of the boards 11, 12.

As shown in the portion (a) of FIG. 3, the amount of used resource of the CPU of the first board 11 is 80%, and the amount of used resource of the CPU of the second board 12 is 30%. Therefore, one of components of the first board 11 may be moved to the second board 12.

For this, the dynamic reconfiguration unit 130 selects one component A from components of the first board 11 and loads the selected component on the second board 12.

Referring to a portion (b) of FIG. 3, the selected component A is reconfigured from the first board 11 to the second board 12, and the amount of used resource of the CPU of the first board 11 is reduced from 80% to 60%.

Therefore, the risk for a scarcity of resources of the first board 11 is lowered, and the robot may properly perform a task by optimizing amounts of used resources of the boards. In addition, since the configuration of all components of the robot is identical to that of components before reconfiguration, the reconfiguration does not give any influence on the robot which is performing a task.

Figure 4:
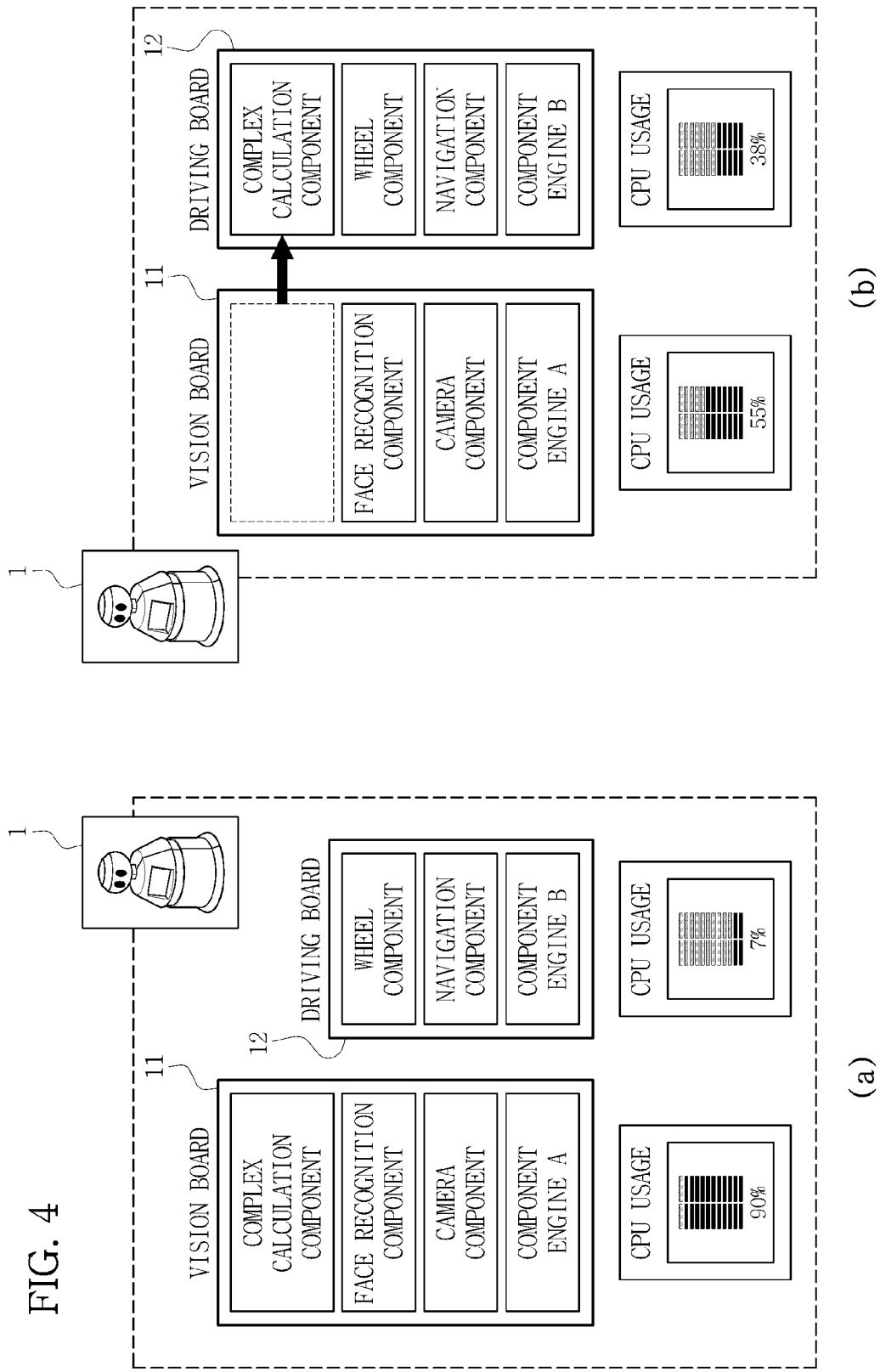
FIG. 4 is a diagram for illustrating an example of detailed components of FIG. 3.

Referring to a portion (a) of FIG. 4, components are respectively disposed at the first board 11 and the second board 12. However, since the amount of used resource of the CPU of the first board 11 is 90% which is very high and the amount of used resource of the CPU of the second board 12 is 7% which is very low, resources are used inefficiently. In this case, the first board 11 may be overloaded, and so the robot 1 may malfunction, for example an output image may be cut off.

For example, if the first board 11 is a vision board and the second board 12 is a driving board, a face recognition component and a camera component are components executable only in the first board 11. On the other hand, a complex calculation component is executable in the first board 11 as well as in the second board 12.

Therefore, the device 10 for dynamic reconfiguration of robot components according to the present disclosure may reconfigure components by selecting the complex calculation component and loading the complex calculation component on the second board 12.

Referring to a portion (b) of FIG. 4, resources may be efficiently used by reconfiguring the complex calculation component, where the amount of used resource of the CPU of the first board 11 is 55% and the amount of used resource of the CPU of the second board 12 is 38%.

Therefore, the risk of the first board 11 for a scarcity of resources is lowered, and it is possible to prevent the robot from malfunctioning by optimizing amounts of used resources of the boards.

Even though FIGS. 3 and 4 have been described based on the multi-board robot shown in FIG. 1, this embodiment may also be applied to a single board as shown in FIG. 2. In this case, a component may be moved from a single board in the robot to a board out of the robot.

Figure 5:
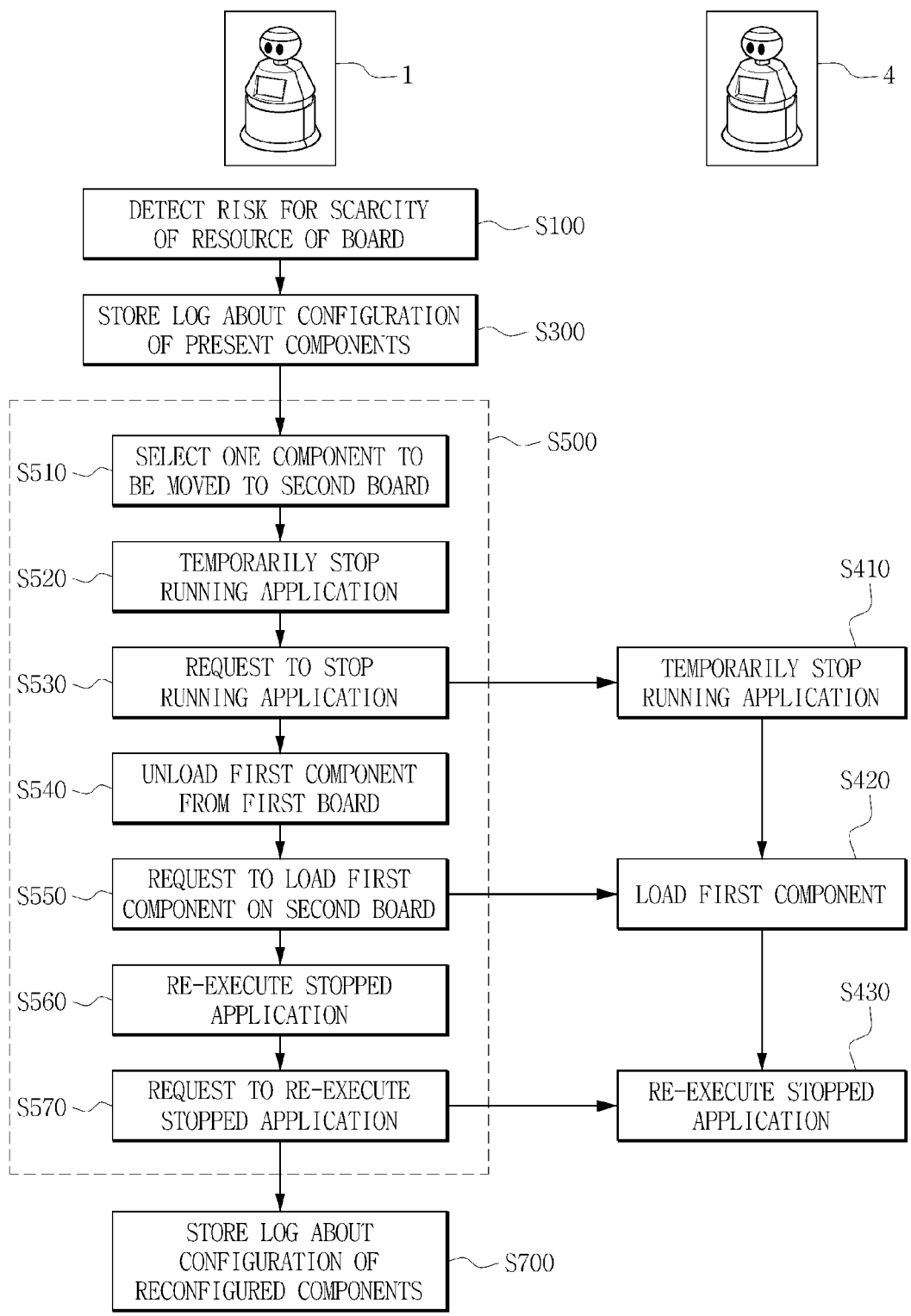
FIG. 5 is a flowchart for illustrating a method for dynamic reconfiguration of robot components according to an embodiment of the present disclosure.

FIG. 5 is a flowchart for illustrating a method for dynamic reconfiguration of robot components according to an embodiment of the present disclosure.

Referring to FIG. 5, if an amount of used resources rapidly increases while monitoring a plurality of resources on which components for performing a task of the robot 1 are loaded, a risk for a scarcity of resources is detected in advance (S100). The resource monitoring may be performed to resources of not only a board in the robot 1 but also other external boards or another board in the robot 1.

Hereinafter, for example, the case where the first board in the robot 1 monitors resources of a second board of another robot 4 which makes networking communication with the robot 1 and reconfigures components.

In this case, a log about the configuration of present components is recorded (S300), and components of the boards are dynamically reconfigured (S500). The operation of dynamically reconfiguring components the boards (S500) will be described below in detail.

First, among components of the first board which is at a risk for a scarcity of resources, a single component to be moved to the second board is selected (S510). The selected component is executable in the second board.

The first board temporarily stops a running application (S520) and also requests the second board to stop a running application (S530). The second board requested to stop an application temporarily stops a running application (S410).

Subsequently, the selected first component is unloaded from the first board (S540), and the unloaded first component is requested to be loaded on the second board (S550). The second board requested to load the first component loads the first component (S420).

After that, the first board re-executes the stopped application (S560) and also requests the second board to re-execute the stopped application (S570). The second board requested to re-execute the application executes the stopped application again (S430).

If the operation of dynamically reconfiguring components of the boards (S500) is completed, a log about a configuration of the reconfigured components is stored (S700).

After components are reconfigured, if the scarcity of resources is not solved or a scarcity of resources occurs at another board to which the component is moved, components are reconfigured in the same way (S500). In this case, based on the stored configuration of components, a configuration of components where a scarcity of resources has occurred may be excluded.

Therefore, according to the method for dynamic reconfiguration of robot components according to this embodiment, amount of used resources of boards in or out of the robot are measured for each board, and if it is determined that a specific board has a risk for a scarcity of resources, components may be reconfigured by loading one component to another board. Accordingly, computation power required for measuring an amount of used resource may be reduced, and it is possible to distribute the use of resources of the boards and to prevent the robot from malfunctioning by reconfiguring components.

While the exemplary embodiments have been shown and described, it will be understood by those skilled in the art that various changes in form and details may be made thereto without departing from the spirit and scope of the present disclosure as defined by the appended claims.

What is claimed is:

1. A device, comprising computing hardware, for dynamic reconfiguration of robot components, the computing hardware configured to:
   monitor resources of a plurality of boards, on which components for executing tasks of the robot are loaded, and to determine whether any of the boards has less than a specified amount of resources available;
   dynamically reconfigure components of the boards, in response to determining that a board has less than the specified amount of resources available; and
   store a configuration of the boards' components both before and after a reconfiguration.

2. The device for dynamic reconfiguration of robot components according to claim 1, wherein the computing hardware reconfigures components of the boards by selecting a first component, which is executable on a second board, from components of a first board, which is determined to have less than the specified amount of resources available, and loads the selected first component on the second board.

3. The device for dynamic reconfiguration of robot components according to claim 2, wherein after components are reconfigured and in response to determining the second board has less than the specified amount of resources available, the computing hardware selects a component from the second board and loads the selected component on the first board or a third board.

4. The device for dynamic reconfiguration of robot components according to claim 3, wherein in response to components being reconfigured, the computing hardware excludes a configuration of a component based on a stored configuration of components.

5. The device for dynamic reconfiguration of robot components according to claim 4, wherein in response to determining the second board has less than the specified amount of resources available, the computing hardware selects the first component from the second board and loads the selected first component on the third board or selects a second component and loads the selected second component on the first board or the third board.

6. The device for dynamic reconfiguration of robot components according to claim 2, wherein the selected first component is an algorithm processing component or a calculation component.

7. The device for dynamic reconfiguration of robot components according to claim 2, wherein the first board and the second board are formed in the robot.

8. The device for dynamic reconfiguration of robot components according to claim 2, wherein the first board is formed in the robot and the second board is formed out of the robot.

9. The device for dynamic reconfiguration of robot components according to claim 8, wherein the second board is formed externally in another robot or a computer existing in a networking environment with the robot.

10. The device for dynamic reconfiguration of robot components according to claim 9, further configured to provide network communication with the outside of the robot.

11. A method for dynamic reconfiguration of robot components, the method comprising:
- monitoring resources of a plurality of boards on which components for executing tasks of a robot are loaded;
- determining, based upon the monitoring, whether any of the boards has less than a specified amount of resources available; and
- upon determining that a board has less than the specified amount of resources available:
    - storing a configuration of the components on the boards;
    - dynamically reconfiguring components of the boards; and
    - storing a configuration of the reconfigured components.

12. The method for dynamic reconfiguration of robot components according to claim 11, wherein said dynamically reconfiguring of components of the boards includes:
- selecting a first component, which is executable on a second board, from components of a first board that is determined to have less than the specified amount of resources available; and
- loading the selected first component on the second board.

13. The method for dynamic reconfiguration of robot components according to claim 12, wherein said loading of the selected first component on the second board includes:
- temporarily stopping execution of applications of the first and second boards;
- unloading the first component from the first board;
- loading the first component on the second board; and
- requesting re-execution of the temporarily stopped applications.

14. The method for dynamic reconfiguration of robot components according to claim 12, wherein said dynamically reconfiguring of components of the boards includes:
- newly selecting a component from components of the second board, which is determined to have less than the specified amount of resources available, after components are reconfigured; and
- loading the newly selected component on the first board or a third board.

15. The method for dynamic reconfiguration of robot components according to claim 14, wherein said dynamically reconfiguring of components of the boards includes excluding a configuration of a component based on a stored configuration, when reconfiguring components.

16. The method for dynamic reconfiguration of robot components according to claim 15, wherein said dynamically reconfiguring of components of the boards includes excluding the first component when selecting a component to be loaded on the first board.

17. The method for dynamic reconfiguration of robot components according to claim 12, wherein said loading of the first component on the second board includes loading the first component from the first board formed in the robot on the second board formed in the robot.

18. The method for dynamic reconfiguration of robot components according to claim 12, wherein said loading of the first component on the second board includes loading the first component from the first board formed in the robot on the second board formed externally in another robot or a computer existing in a networking environment with the robot.

19. The method for dynamic reconfiguration of robot components according to claim 18, further comprising performing network communication with the outside of the robot.

* * * * *